Oct. 24, 1933.    P. F. JACKSON    1,931,763
CURRENT MEASURING DEVICE
Filed Feb. 2, 1931
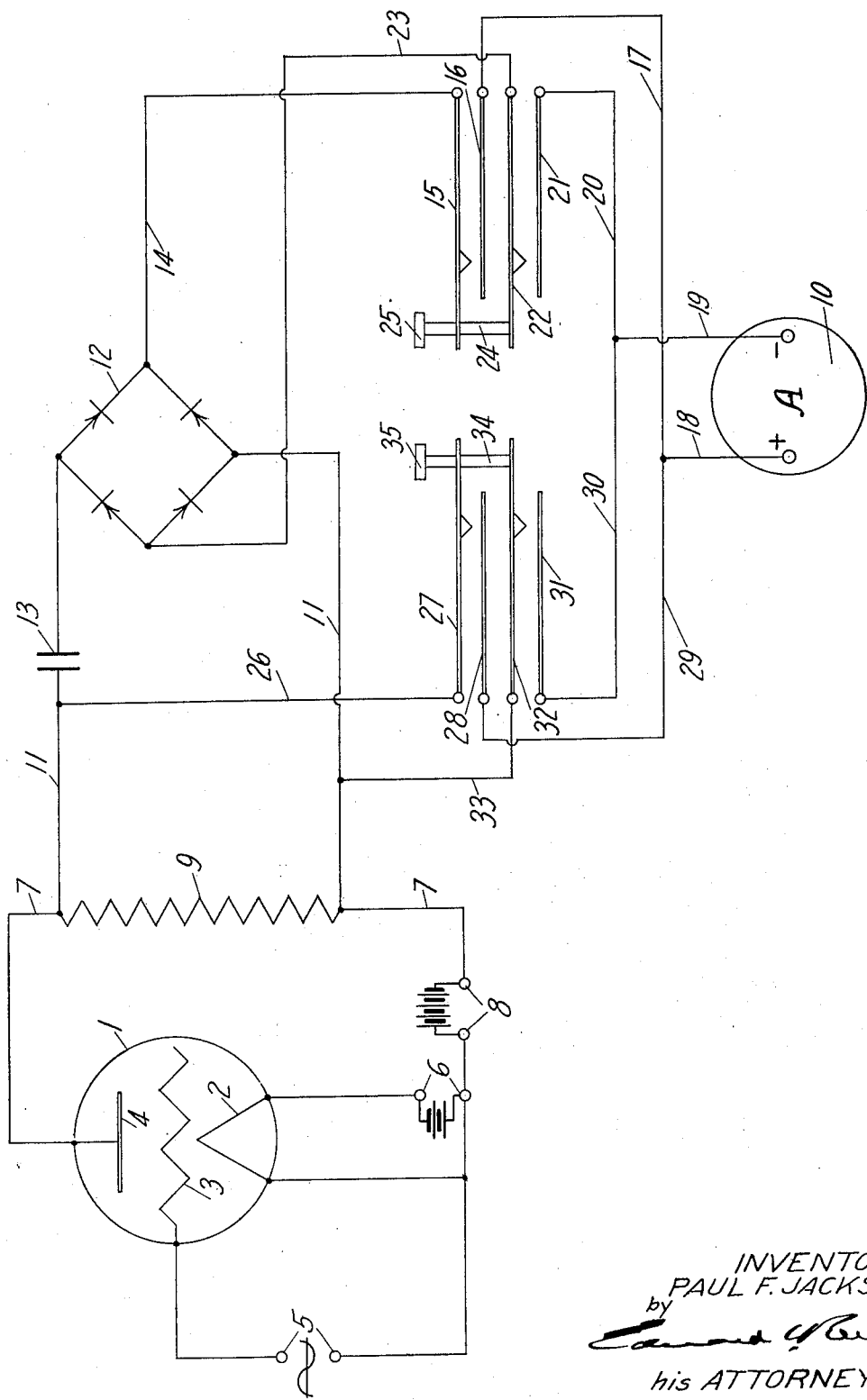
INVENTOR.
PAUL F. JACKSON.
by
his ATTORNEY.

Patented Oct. 24, 1933

1,931,763

UNITED STATES PATENT OFFICE 1,931,763

CURRENT MEASURING DEVICE

Paul F. Jackson, Dayton, Ohio, assignor to The Radio Products Company, Dayton, Ohio, a corporation of Ohio Application February 2, 1931. Serial No. 512,776

2 Claims. (Cl. 250—27)

This invention relates to a current measuring device and is designed primarily for use in an apparatus for testing audion tubes. As is well known the plate circuit of a tube testing apparatus carries both alternating current and direct current. In a proper test of the tube the two kinds of current should be measured separately and it is one object of the invention to provide a device which will separate the alternating current component from the direct current component for the purpose of measuring the same individually.

A further object of the invention is to provide such a device which will separate the alternating current from the direct current and rectify the alternating current for measurement on a direct current instrument.

A further object of the invention is to provide such a device which will be simple in character and adapted to measure either kind of current at the will of the operator.

Other objects of the invention will appear as the device is described in detail.

The drawing is a diagrammatic illustration of a portion of a tube testing apparatus embodying my invention.

In this drawing I have illustrated one embodiment of the invention but it will be understood that various changes may be made therein without departing from the spirit of the invention.

Inasmuch as the tube testing apparatus as a whole forms no part of the invention I have illustrated only so much thereof as is necessary to an understanding of the invention. Such a tube testing apparatus comprises a tube socket 1 having terminals for connection, respectively, with a filament 2, a grid 3 and a plate 4 of a tube inserted in that socket. When the tube is inserted in contact with the several terminals the filament is connected with an alternating current signal input circuit 5 and, at 6, with a separate source of current for heating the filament. The grid is connected with the signal input circuit 5, and the plate 4 is connected with a plate circuit 7 which is connected at 8 with a separate source of direct current, all in a well known manner. It will be apparent therefore that the plate circuit receives a direct current from the source 8 and an alternating current originating from the signal input 5.

Interposed in the plate circuit is a resistance 9 and connected across this resistance is a direct current measuring instrument or ammeter 10. Means are provided for directly connecting the ammeter across the resistance in the plate circuit to measure the direct current and other means are provided for separating the alternating current from the direct current, rectifying the same and passing the rectified current through the direct current ammeter 10. In the arrangement here shown, a shunt circuit 11 is connected with the plate circuit 7 at the respective ends of the resistance 9. Interposed in this shunt circuit is a rectifier 12 and interposed in the shunt circuit, between the rectifier and the positive side of the plate circuit is a condenser 13 which will permit the passage of alternating current but will prevent the passage of direct current. The rectifier may be of any suitable character and is connected with the direct current ammeter through a suitable circuit embodying a circuit breaker and closer for controlling the same. In the arrangement shown, the switch is of such a character that both sides of said circuits connecting the rectifier with the ammeter may be broken and one side of the rectifier is connected by a conductor 14 with a movable switch member 15, preferably a resilient bar, which is normally out of contact with but is adapted to be moved into engagement with a stationary switch member 16 which is connected by conductors 17 and 18 with the positive side of the direct current ammeter. The negative side of the ammeter is connected by conductors 19 and 20 with a stationary switch member 21 normally out of contact with and adapted to be engaged by a movable switch member 22, which preferably comprises a resilient bar, and this switch member 22 is connected by a conductor 23 with the other side of the rectifier. The movable switch members 15 and 22 may be connected as shown at 24 so that the operation of an actuating member or push button 25 will simultaneously close both sides of the circuit and thus establish an operative connection between the direct current ammeter and the plate circuit and enable the alternating current, which passes the condenser 13, and is rectified by the rectifier 12, to be measured and the value thereof indicated on the direct current ammeter.

The ammeter 10 may be directly connected with the plate circuit for the purpose of measuring direct current and I have here shown the shunt circuit 11 as connected with the ammeter through a circuit having a switch to open and close both sides thereof. To this end one side of the shunt circuit 11 is connected by a conductor 26 with a movable switch member 27 adapted to be moved into contact with the stationary switch member 28 which is connected by conductors 29 and 18 with the positive side of the ammeter. The negative side of the ammeter is connected by conductors 19 and 30 with the stationary switch member 31 adapted to be engaged by the movable switch member 32 which is connected by a conductor 33 with the other side of the shunt circuit. The movable switch members 32 and 27 may be connected as shown at 34 for simultaneous operation by a push button or the like, 35.

The movable contact members of both switches are so arranged that they will be normally out of engagement with the respective stationary switch members and both circuits will be open. By closing the proper switch either the alternating current or the direct current may, at the will of the operator, be measured on the direct current ammeter.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus comprising a circuit carrying both alternating current and direct current, a resistance in said circuit, a rectifier connected across said resistance, a direct current measuring instrument connected with said rectifier, a condenser interposed between said rectifier and said circuit, and means for connecting said measuring instrument across said resistance independently of said condenser and said rectifier.

2. In an apparatus comprising a circuit carrying both alternating current and direct current, a resistance in said circuit, a rectifier connected across said resistance, a condenser interposed between said rectifier and said circuit, a direct current measuring instrument, means including a switch to connect said measuring instrument with said rectifier to measure rectified alternating current, and means including a switch to connect said measuring instrument across said resistance independently of said condenser and said rectifier to measure direct current.

PAUL F. JACKSON.